March 23, 1965 J. P. WALKER ETAL 3,174,926
METHODS AND MEANS FOR LOW TEMPERATURE SEPARATION
Filed Dec. 11, 1961 3 Sheets-Sheet 1
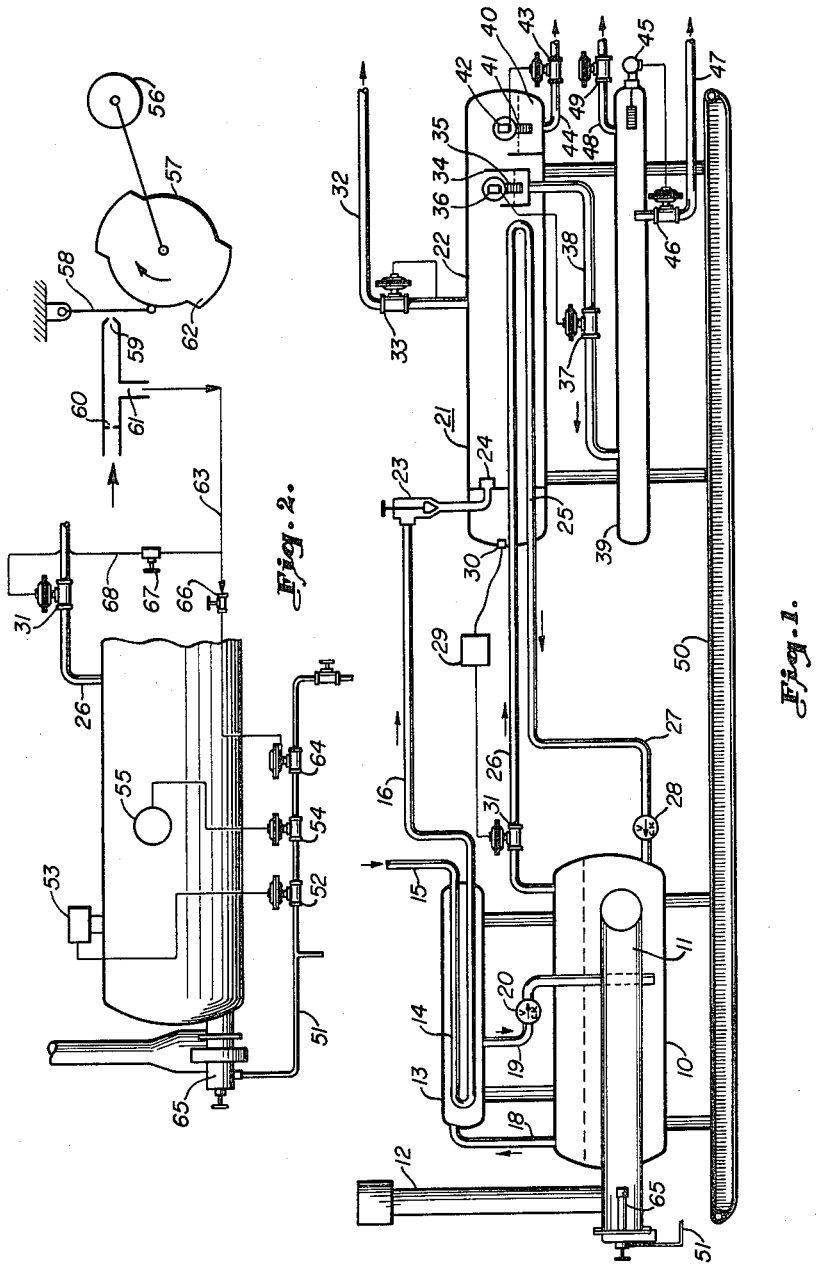
INVENTORS.
JAY P. WALKER
ROBERT W. COGGINS
BY
ATTORNEY

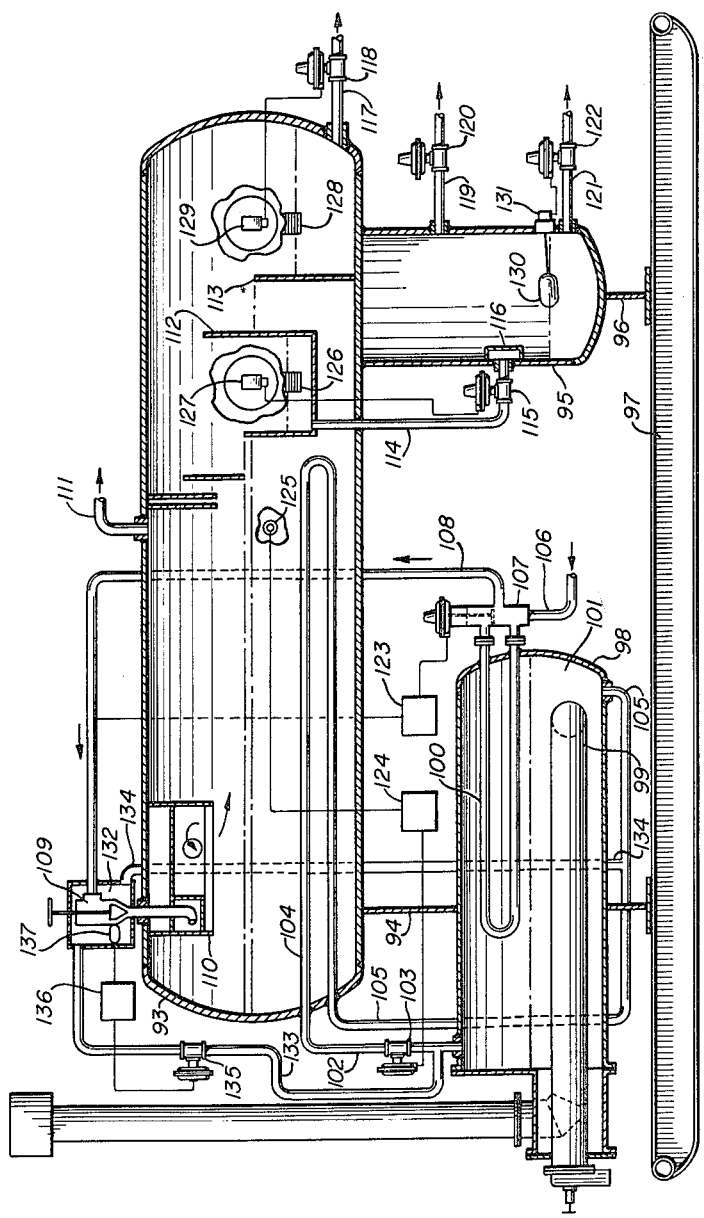

March 23, 1965   J. P. WALKER ETAL   3,174,926
METHODS AND MEANS FOR LOW TEMPERATURE SEPARATION
Filed Dec. 11, 1961   3 Sheets-Sheet 3

INVENTORS.
JAY P. WALKER
ROBERT W. COGGINS
BY
ATTORNEY

United States Patent Office 3,174,926
Patented Mar. 23, 1965

3,174,926
METHODS AND MEANS FOR LOW TEMPERATURE SEPARATION
Jay P. Walker and Robert W. Coggins, both of Tulsa, Okla., assignors to National Tank Company, Tulsa, Okla., a corporation of Nevada
Filed Dec. 11, 1961, Ser. No. 158,187
2 Claims. (Cl. 208—340)

This invention relates to new and useful improvements in methods and means for low temperature separation.

The invention is particularly directed toward the field of low temperature separation of distillate and water from relatively high pressure well streams of the type in which a considerable or a major portion of the recoverable hydrocarbons may be present in the gaseous phase. Such recovery units normally involve a low temperature separation vessel into which the well stream is expanded through a choke, or other pressure reducing means, for temperature reduction and condensation or liquefaction of the valuable light hydrocarbons, as well as the liquefaction of water which may be present in the vapor phase and which must be removed from the gaseous portion of the well stream prior to introduction of the latter into a gas transmission pipe line.

Low temperature separation units customarily include means for heating a portion or all of the separated liquids in order to melt any ice or gas hydrates which may be present, and it has been the practice to pass the incoming well stream through heating coils in the lower portion of the low temperature separation unit for supplying the necessary heat. Such a system often entails, however, the addition of heat to the well stream prior to its passage through the heating coils, and due to the heat transfer conditions which necessarily ensue, the well stream must be heated to temperatures well above those temperatures desired in the liquids in the lower portion of the low temperature separation unit.

Under some conditions, the well stream may need some degree of heating prior to its passage through the choke or other pressure reduction means in order to make certain that the well stream will be above the point of gas hydrate formation prior to entering the choke so that all hydrates are formed downstream of the choke. When, however, the well stream is heated for the purpose of supplying heat to the lower portion of the low temperature separation unit, it is often necessary to heat the stream well above that temperature necessary to insure the absence of gas hydrates prior to expansion of the well stream. Accordingly, the entire system is thus operated at a higher temperature than that required, and the recovery of the desired portions of salable hydrocarbons is consequently reduced or prevented.

It is also a common practice to supply heat constantly or at a constant rate to the lower portion of the low temperature separation unit, both for the reason that such continuous heating is often or usually necessary in order to melt all of the hydrates which may be formed, as well as to overcome the inherent difficulties in achieving adequate heat transfer from a predominantly gaseous well stream to a body of liquid through heat exchange or heater coils. Here again, there is often a wasteful heating of the well stream, large quantities of gas are required for continuously effecting such heating, and the well stream enters the choke at higher than necessary temperatures.

It has also been common practice to supply heat to the lower portion of the low temperature separation unit in quantity sufficient to prevent any accumulation of hydrates in the unit. Mechanical clogging of the output conduits of the units is avoided, but the high level of heat is not only wasteful of fuel but drives off normally liquefiable hydrocarbons from the unit as a gaseous phase. Precise control of the heating of the units has been avoided for fear of clogging the conduits and either preventing production through the units or blowing their safety heads.

It is, therefore, one object of this invention to provide improved methods and means of low temperature separation in which the heat of stream is employed for heating the lower portion of the low temperature separation unit, both to obtain very effective heat transfer and utilization of the heat supplied through the steam, as well as to provide for whatever heating of the well stream may be necessary to prevent the formation of gas hydrates upstream of the pressure reducing choke and/or to control the composition of the gas leaving the low temperature unit.

A further object of the invention is to provide improved methods and means for low temperature separation particularly adapted to utilization with well streams flowing as fairly low rates, or well streams of moderate pressure in which a limited pressure reduction step is available, or well streams of modest liquid volumes in which steam is utilized for heating purposes in order that the relatively small volumes of well fluids need not be heated to excessive temperatures for the purpose of supplying heat to the low temperature separation unit, as well as to insure operation of the unit at the lowest possible temperatures in order that full advantage may be taken of whatever pressure drops are available.

An additional object of the invention is to provide improved methods and means for low temperature separation particularly adapted to utilization in instances in which it may be desired to vary the flowing volumes of well streams rapidly over wide ranges.

Yet another object of the invention is to provide improved methods and means for low temperature separation wherein all necessary or required heating is carried out by steam which may be utilized at intervals or on a time-controlled basis so that the heating of the low temperature separation unit is not continuous but is supplied only at intervals and with high effectiveness to melt or decompose any gas hydrates which may have accumulated in the low temperature separation unit, resulting in an overall operation of the low temperature unit at minimum temperatures for maximum dehydration of the well stream and maximum hydrocarbon recovery.

Yet another object of the invention is to provide improved method and means for low temperature separation wherein all necessary or required heating is carried out by steam controlled by the temperature of the liquids in the lower part of the separator so that the heating is not continuous, but is supplied on demand so the temperature of the liquids will cycle between predetermined maximum and minimum values, maintaining the temperature values for predetermined periods of time, resulting in an overall operation of the low temperature unit at minimum temperatures for maximum dehydration of the well stream and maximum hydrocarbon recovery.

An additional object of the invention is to provide improved methods and means for low temperature separation in which a source of steam is employed on a controlled basis for supplying heat to the low temperature separation unit, and on a separately controlled basis for supplying heat to the incoming well steam prior to its passage through the pressure reducing choke for preventing the formation of gas hydrates upstream of said choke and/or to predetermine the hydrocarbon composition of the gas flowing from the unit.

Yet a further object of the invention is to provide improved methods and means for low temperature separation wherein the incoming well stream may be heated to any necessary or desired degree to produce an outlet gas of desired or selected hydrocarbon composition.

A further object of the invention is to provide improved low temperature separation means having steam heating coils in which the possibility of freezing of water in the coils, with consequent possible damage to or rupture of the coils, is avoided.

Other and more particular objects wil be apparent from a reading of the following specification and claims.

A construction designed to carry out the invention will be hereinafter described, together with other features of the invention.

The invention will be more readily understood from a reading of the following specification and by reference to the accompanying drawings, wherein examples of the invention are shown, and wherein:

FIG. 1 is a diagrammatic view illustrating a low temperature separation unit constructed in accordance with this invention and adapted to carry out methods hereof;

FIG. 2 is a schematic view showing a means for controlling the intermittent heating of the low temperature separator;

FIG. 3 is a diagrammatic view illustrating a still further modification of the invention;

Figure 4:
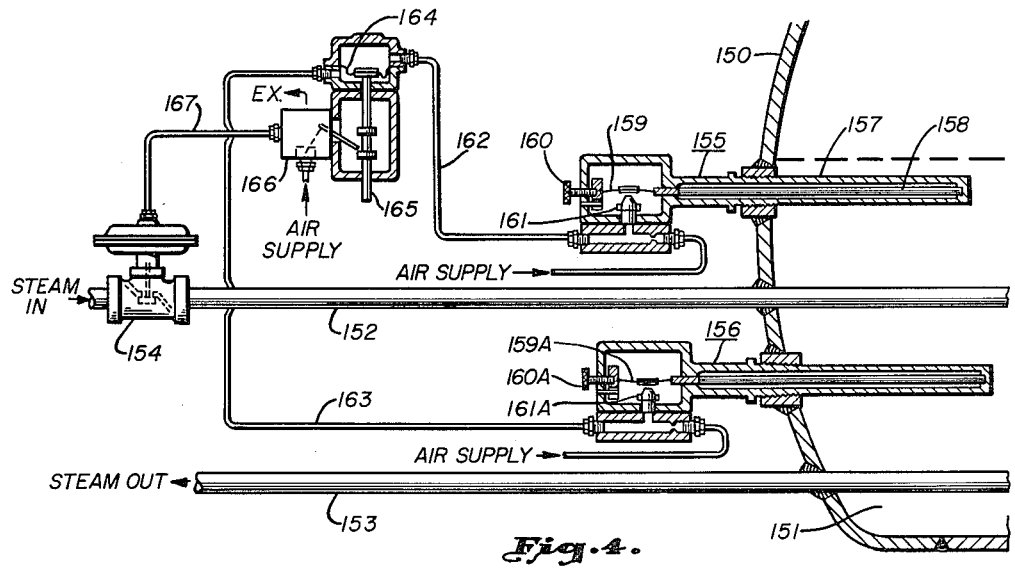
FIG. 4 is a schematic view showing control of the intermittent heating of the low temperature separator to cycle between two temperatures.

Turning now to FIG. 1 of the drawings, the numeral 10 designates a steam generation vessel of the type which may operate on automatic controls unattended by operating personnel. A fire tube or other heating means 11 extends into the vessel for supplying heat thereto, the fire tube having a flue or vent 12 and being adapted for supplying heat to the interior of the vessel 10 for the generation of steam, as an example steam supplied under a pressure of the magnitude of 15 pounds per square inch or under higher or lower pressures. A well stream preheater 13 is associated with the steam generator and encloses a set of preheat coils 14 having a well stream inlet conductor 15 connected thereto and a well stream outlet conductor 16 loading therefrom. A steam conductor 18 loads from the upper portion of the steam generator 10 into the enclosure 13, and a condensate drain pipe 19 leads from the lower portion of the enclosure 13 through a check valve 30 into the lower portion of the steam generator 10, or at least, a point below the normal operating water level therein. As pointed out hereinafter, suitable temperature or pressure control means may be incorporated in the steam supply conductor 18 for controlling the degree of heating of the well stream in the coils 14 in order that the well stream may be maintained at a level just above the point of gas hydrate formation prior to pressure reduction of the well stream and/or in order that the composition of the gas leaving the low temperature unit may be varied or controlled.

A low temperature separation unit 21 is associated with the steam generator 10, the low temperature separator desirably comprising an elongate horizontal vessel 22 into which the well stream conductor 16 opens through a choke or other pressure reducing means 23 and a diverter 24. A set of heating coils 25 is disposed in the lower portion of the vessel 22 with their lowest point above the steam generator 10 and has connected thereto a steam inlet conductor 26 leading from the upper portion of the steam generator and a condensate return conductor 27 connected into the lower portion of the steam generator through a check valve 28. A temperature controller 29 senses the heating of the lower portion of the vessel 22 through a temperature bulb 30 and controls a motor valve 31 in the steam inlet conductor 26 for maintaining the desired degree or level of heating within the vessel 22.

A gas outlet conductor 32 leads from the upper portion of the vessel 22 through a back pressure valve 33 for withdrawing separated gas from the low temperature separator, and a distillate or liquid hydrocarbons overflow sump 34 positioned near the end of the vessel 22 opposite the inlet diverter 24 is provided with a float 25 and a float control unit 36 for operating a diaphragm valve 37 positioned in a distillate outlet conductor 38 extending from the sump 34 to a low pressure separator 39. A water overflow sump 40 is provided in the vessel adjacent the sump 34 and encloses a float 41 operating a control unit 42 which controls the opening and closing of a diaphragm valve 43 provided in a water outlet conductor 44 extending from the lower portion of the sump 40. The low temperature separation unit 21 and the arrangements for removing separated gas, hydrocarbons, and water therefrom, is shown and described in detail in the U.S. patent Jay P. Walker et al. No. 2,747,002.

The low pressure separator 39 is equipped with a float-operated liquid level control 45 for operating a motor valve 46 provided in the hydrocarbon discharge conductor 47 leading from the lower portion of the separator 39 to a point of hydrocarbon storage. There is also provided a gas outlet conductor 48 loading from the separator 39 through a suitable back pressure valve 49.

The steam generator 10 and low temperature separation unit 21 may desirably be mounted upon a common base or platform 50, and the preheater 13 may desirably be mounted upon the upper side of the steam generator 10. In this manner, a unitary and compact structure results, and much of the piping and other connections may be completed prior to actual installation of the unit at a producing well in the field.

In the operation of this form of the invention, the well stream, under high pressure, enters through the conductor 15 and passes through the preheater coils 14 for elevation to a temperature sufficient to avoid the formation of gas hydrates in the well stream prior to the passage thereof through the choke 22, and/or to predetermine the temperature and hydrocarbon composition of the gas leaving the low temperature separator. Steam will be supplied to the preheater enclosure 13 through the conductor 18 in such quantities as necessary to carry out the aforesaid heating, and as the steam condenses in the course of such heating, the condensates will be returned to the steam generator 10 through the conductor 19 and check valve 20. The check valve, as is usual for this type of steam supply, prevents the reverse flow of fluids through the conductor 19 from the steam generator to the preheater enclosure. Of course, in some instances, the preheater 13 may be eliminated entirely, primarily when the well stream enters at such a temperature and pressure that heating thereof to prevent premature hydrate formation is unnecessary and/or when control or variation in the composition of the existing gas is not desired.

In passing through the choke 23, the well stream undergoes an appreciable pressure reduction and is therefore chilled to a quite marked extent which causes the formation of ice and/or gas hydrates, along with the liquefaction of hydrocarbons and water. By this means, the gaseous portion of the well stream is sufficiently denuded of water and hydrocarbons as to permit its sale to a gas transmission pipe line, and at the same time, quantities of the valuable and salable liquid hydrocarbons are recovered. In the vessel 22, the hydrates and liquid portions of the well stream are separated from the gaseous portion, dehydrated gas being drawn off through the outlet conductor 32 while the liquids settle and stratify in the lower portion of the low temperature separation vessel. It is necessary to supply heat to the lower portion of the vessel 22, at least at intervals, to make provision for melting of any ice and/or gas hydrates which may be present, and this is carried out by the coils 25 which receive steam through the conductor 26 and return condensate to the steam generator 10 through the conductor 27. Through utilization of the temperature controller 29, the valve 31 is opened and closed only sufficiently to maintain the desired temperature within the lower portion of the vessel 22, and accordingly, the very minimum amount of heat necessary for melting of the ice and/or hydrates is employed and excessive heating of the dehydrated gas or the separated distillates is avoided.

Temperature controller 29 may be arranged to respond to the temperature sensed by bulb 30 and control the motor valve 31 in the steam inlet conductor 26 to regulate the temperature within vessel 22 between certain predetermined limits. It may be quite practical to have controller 29 set to hold the temperature within vessel 22 to a certain predetermined low value at which hydrates will accumulate within vessel 22, but the benefit of greatly dehydrated gas and increase liquefaction of hydrocarbons attained. Depending on the particular condition of the well stream processed, this operation may continue for a significant period of time. Hydrates will collect, but not enough to clog the outlet conduits of vessel 22.

Temperature controller 29 can be set to raise the temperature of vessel 22 after hydrates have collected to the extent that they threaten continuous operation of the system. Steam from conduit 26 will be used to raise this temperature, the steam controlled by valve 31 of course. A predetermined amount of steam, temperature rise—for a predetermined time—will quickly melt the hydrates within vessel 21 and prepare for the next period of low temperature operation. Operation in this manner will enable the very minimum amount of heat to be used in melting the ice and/or hydrates with no excessive heating of the dehydrated gas or the separated distillate. In a very real sense, temperature controller 29 can establish a program of temperature conditions, with a feedback from the actual temperature of vessel 21.

The separated water is removed from the sump 40 through the outlet conductor 44, while separated distillates pass from the sump 34 into the low pressure separator 38, which is operated at a pressure well below that of the vessel 22, but considerably above the pressure of the hydrocarbon storage tanks or stock tanks whereby the full benefits of stage separation are obtained, and substantially only that gas is removed from the distillate in the separator 10 which may not be retained in the separated liquids in the storage or stock tanks. As an example, when processing a well stream having a relatively low hydrocarbon content, and assuming that the vessel 22 is being operated at 1,000 pounds per square inch, along with the inclusion in the system of the low pressure separator 39 operating at a pressure of 75 pounds per square inch at 70° F., an additional recovery of approximately one barrel per million standard cubic feet of gas will be realized over and above the recovery which would be made if the low pressure separator 39 were not utilized. At lower operating temperatures, the increase in recovery is, of course, correspondingly higher. On this basis, the low pressure separator 39 is not essential or necessarily used with the remainder of the system, but in most instances, the increased recovery which is realized through use of the low pressure separator 39 warrants its inclusion in the system.

Basically, the operation of the low temperature separation unit illustrated in FIG. 1 of the drawings is essentially that of the similar units disclosed in the aforesaid U.S. patent to Walker et al. No. 2,747,002, with several very important exceptions. First, disregarding those instances in which the well stream flows at a temperature high enough to carry out the necessary heating of the lower portion of the low temperature separator for melting of the gas hydrates, the present unit may operate at lower temperatures than units in which the well stream is passed through the heating coils and hence will afford greater recoveries of marketable liquid hydrocarbons due to the enhanced condensation of such hydrocarbons from the well stream. Assuming that the low temprature unit is operating under such conditions of pressure that the water stratum in the lower portion of the separator must be maintained at a temperature of 75° to 80° F., it will be necessary that the largely gaseous well stream leave the heating coils at a temperature of 90° to 100° F. due to the heat exchange conditions between the well stream, the coils, and the liquid in the lower portion of the low temperature separator. Consequently, the well stream will enter the choke 23 at a temperature much higher than the temperature of gas hydrate formation, and this increased temperature will be reflected in the operating temperature of the low temperature separator 21, usually resulting in a temperature of 15° to 20° F. higher than can be obtained with the present invention. Utilizing the present disclosure, however, the temperature of the well stream entering the choke 23 may be maintained at a point just above the temperature of gas hydrate formation, and consequently, the temperature within the separator 21 will be depressed to the degree that will produce maximum liquefaction of hydrocarbons and maximum dehydration of the well stream.

Second, since the lowest possible temperature is achieved in the separator 21, the gaseous portion of the well stream will be denuded of water and hydrocarbons to a maximum degree, thus insuring maximum dehydration and maximum removal of liquid hydrocarbons from the sales gas being withdrawn to a gas transmission pipe line through the gas outlet conductor 32. Further, since at least a portion of the gas being withdrawn from the low pressure separator 39 through the gas outlet pipe 48, and on occasion, a portion of the high pressure gas withdrawn through the outlet 32, is utilized for fuel gas for the fire tube 11 as well as pilot gas for operating the various controls and motor valves, the increased denuding of this gas of all liquids will minimize freezing problems in the various gas supply and pilot gas lines and assure the operator of more trouble-free performance of the low temperature separation system.

Third, the utilization of steam coils for supplying heat to the lower portion of the low temperature separation unit 21 takes advantage of the high heat transfer coefficient of steam and the high mean temperature differential between the steam coil and the warm water in the lower portion of the vessel 22 in which the steam coil is immersed. This permits the low temperature separation unit 21 to accommodate larger volumes of hydrates, ice, water, and distillate due to the high heating effectiveness of the steam coil, and consequently, the utilization of a high pressure separator or water knockout upstream of the choke 23 is avoided or at least delayed for a maximum period of time. Since the unit can handle larger volumes of liquid and hydrates, it becomes unnecessary to remove a portion of such liquids prior to introduction of the well stream into the low temperature separator, and thus, the expense of installing, maintaining, and operating a high pressure separator or water knockout is avoided. In addition, the unit is capable of handling greater quantities of drilling mud and other foreign material which may be present in the well stream, along with waxes, emulsified distillate, and the like. Here again, the high heat transfer characteristics of the steam coil make these additional advantages possible. Still further, a reduction in the consumption of fuel gas is observed since less gas must be burned to generate sufficient steam to carry out the desired heating functions than would be required to obtain the same amount of heating through warm or hot gas passed through the coils 26. This is true because all of the heat cannot be removed from the heated gas, whereas the steam gives up virtually all of its heat in the form of its latent heat of vaporization, the condensate being returned to the steam generator 10 as a liquid very near or at the boiling point of water. Accordingly, the heat input to the steam generator is almost entirely utilized in the heating coils 35, and consequently, a marked reduction in fuel gas consumption is obtained.

The steam generator unit 10 may be provided with all necessary or desirable controls, the fuel gas supply line 51 having interposed therein, as shown in FIG. 2, a motor valve 52 operated by a steam pressure regulator 53, a motor valve 54 operated by a low water level alarm 55, and such other controls and shutoff valves as may be found desirable such as burner tube temperature shutoff valves and the like. Thus, automatic operation of the steam generator at the desired temperatures and pressures is insured and the need for manual supervision is eliminated.

As pointed out hereinbefore, the present system lends itself to intermittent operation in which the steam generator is periodically fired for the generation of steam to melt or thaw ice and/or gas hydrates present within the low temperature separator 21 and to otherwise supply at intervals the heating desired for continuous and proper operation of the low temperature separator. Continuous heating is not essential, however, due to the high heating capacity of the steam system and the ability of such system to handle at intervals accumulated heating requirements, possibly in the form of gas hydrates which have accumulated in the vessel 22 over a period of several hours. Provision for such intermittent heating is illustrated in FIG. 2, there being provided a suitable clock or time-controlled mechanism 56 driving a lobed cam 57 which, in turn, operates a flapper valve 58 to open or close an orifice 59. Supply gas under pressure is furnished to the orifice 59 through an orifice 60, and normally escapes through the orifice 59 without creating a back pressure in the branch conductor 61. When, however, one of the lobes 62 of the cam 57 engages the flapper valve 58 to close the orifice 59, a pressure will be built up in the branch conductor 61 and communicated through the pipe 63 to the motor valve 64, opening the latter and supplying the fuel gas to the burner 65 of the fire tube 11 resulting in the generation of steam and the supplying of heat to the coils 25.

Dependent upon the nature of the well stream being handled by the low temperature unit, the time-controlled, intermittent-firing mechanism may be arranged to supply heat for one hour out of each three or four hours, for one hour out of each eight hours of operation, or for such other intervals and durations as may be found necessary or desirable. With such an arrangement, the low temperature separator 21 will be caused to operate at even lower temperatures than would otherwise be obtained since no heat would be supplied thereto for a major portion of its period of operation, and further, the consumption of fuel gas by the steam generator 10 would be reduced to a minimum. Due to the relatively large internal capacity of the vessel 22, proper and efficient low temperature separation may be carried out for extended periods of time without the supplying of any heat to the coils 25, and by reason of the high heating efficiency of the steam system, the vessel 22 may be completely thawed in a relatively short time and then the supply of heat shut off so that the vessel may again operate at a minimum temperature. Of course, the lower the temperature maintained in the vessel 22, the more complete will be the removal of liquid hydrocarbons and water from the gaseous well stream passing therethrough.

There may also be instances in which approximately continuous supplying of heat to the preheater 13 is required or desirable, and in such instances, the intermittent heating of the low temperature separator 21 may be carried out as shown in FIG. 2 by closing the valve 66 interposed in the line 63 and opening the valve 67 provided in a branch line 68 leading to the motor valve 31 which is provided in the steam supply conductor 26. In such case, the temperature controller 29 may be omitted, or it may be employed in conjunction with the illustrated intermitter structure so as to make available, through the duration of the heating period, upper and/or lower limits for the temperature of the water stratum in the low temperature separator.

The temperature control of the incoming well stream will determine to a large extent the internal temperature of the low temperature separator as well as the temperature of the outgoing gas. Hence, such temperature control may be utilized for determining or varying the hydrocarbon composition of the gas. Natural gas is, of course, predominantly methane and includes small percentages of the higher homologous, ethane, propane, butane, isobutane, and so on up to possible some hexane and heptane. When a rich outlet gas, possibly for processing in a gasoline plant, or a very stable distillate, or a minimum gas loss from the discharge of distillate, is desired, the inlet well stream may be brought to higher temperatures for production of such results. Conversely, lower inlet temperatures may be employed for producing a gas of optimum leanness or a very light distillate for subsequent processing, for instance, in a stabilizing column. Manifestly, dependent on the inlet stream, the composition of the outlet gas may be varied over a wide range.

Low temperature separation units are commonly operated at or near the pressure of the gas transmission pipe line into which the unit discharges, and are also often supplied with an inlet well stream at or near well head pressure. Of course, the pressure of the well stream may be reduced at the well head, but because of hydrate formation and other reasons such pressure reduction is not often carried out so that in many cases, the pressure drop across the low temperature unit is more or less set by the well head and pipe line pressures. For this reason, the temperature drop in the well stream is also necessarily set along with the temperature, and therefore the general composition, of the outlet gas.

By being able to vary the inlet temperature of the well stream independently of the temperature in the bottom of the low temperature separator, however, the outlet temperature, and hence the composition, of the outlet gas may be controlled. Thus, by temperature control, a gas free of butanes may be withdrawn, or a gas containing substantially all the butanes in the well stream, within the capacity of the low temperature separator to make such separations. Similarly, the water content of the outlet gas may be controlled to a marked degree, or the presence of other components in the gas.

A somewhat more compact form of the invention is illustrated in FIG. 3 in which an elongate horizontal low temperature separation vessel 93 has one end carried upon an upright support 94 and its opposite end carried on the upper end of a small, low pressure vertical separator 95 having a depending base or support 96 extending downwardly to the platform or skid mounting 97 upon which the lower end of the standard 94 is also carried. The steam generator 98 is also mounted on the support 94 and encloses a fire tube 99 and a preheat coil 100. The generator, of course, is partially filled with a volume of fresh water 101, the steam coil 100 being disposed in the steam or vapor space of the generator, while a steam outlet 102 leads through a motor valve 102 into the heating coil 104 positioned in the lower portion of the vessel 92 above the steam generator and having a condensate line 105 returning to the lower portion of the generator.

The well stream inlet 106 is connected through a three-way valve 107 with the inlet and outlet of the preheater coil 100 and with the well stream conductor 108 loading to the choke 109 and diverter inlet structure 110 disposed within the upper portion of the vessel 93 and adjacent one end thereof. A gas outlet 111 is provided in the upper portion of the vessel 93, and distillate and water overflow sumps 112 and 113, respectively, are provided in the opposite end of the low temperature vessel. The distillate sump 112 has a drain conductor 114 leading through a diaphragm-operated or motor valve 115 to an inlet diverter 116 positioned interiorly of the low pressure separator 95, while the water overflow sump 113 has a water outlet conductor 117 leading through a motor valve 118 to a suitable point of water disposal. The low pressure separator has a gas discharge conductor 119 extending through a back pressure valve 120, and a hydrocarbon or distillate discharge conductor 121 through which flow is controlled by a motor valve 122.

The three-way valve 107 is operated by a temperature controller 123 arranged to respond to the temperature of the fluid passing through the conductor 108 and to shift the valve 107 so as to pass a portion or all of the well stream through the preheater coil 100, or to exclude the well stream from such coil, in order to maintain the well stream at the inlet to the choke 109 at a temperature only slightly above the point of expected gas hydrate formation or at a temperature which will control hydrate formation and/or outlet gas composition. Similarly, the valve 103 is operated by a temperature controller 124 which responds to a temperature probe 125 positioned in the water stratum in the lower portion of the vessel 93 and functioning to maintain said water stratum at a desired or predetermined temperature which will control hydrates in the vessel 93. The distillate overflow sump 112 receives a float 126 which operates a pilot valve or controller 127 which, in turn, operates the valve 116 to drain distillate from the sump into the low pressure separator 95 in accordance with its rate of accumulation.

Similarly, the sump 113 receives a float 128 operating a controller 129 for opening and closing the valve 118 and discharging water from the water overflow sump. A float 130 is positioned within the low pressure separator 95 for operating a pilot valve 131 and, in turn, operating the valve 122 for discharge of separated distillate from the low pressure separator to storage tanks or other point of disposition.

In some instances, it may be desirable or necessary to provide means for heating the choke, or other expansion means as employed in the various forms of the invention, and such means is illustrated in FIG. 4 of the drawings in which the choke 109 is partially or completely enclosed by the steam jacket 132 having a steam supply conductor 133 extending thereto from the lower portion of the supply conductor 102. A condensate return conductor 134 leads from the jacket 132 to the condensate return conductor 105.

For regulating the heating of the choke, a control valve 135 is inserted in the conductor 133 and operated by a temperature controller 136 having a temperature sensing probe 137 responsive to the temperature in the jacket 132 or to the temperature of the walls of the choke 109. Here again, a single source of heating medium, such as the steam generator, is employed for supplying heating under separately and independently controlled conditions to a particular element in the low temperature separation system which may require such heating. The heating of the choke is readily carried out from the same source of heating medium but is controlled entirely separately from the preheating of the well stream as well as separately from the heating of the lower portion of the low temperature separation vessel.

In all principal respects, this last described form of the invention possesses all of the advantages and benefits, and operates in substantially the same manner as the previously described forms, but includes the additional advantages of an extremely compact structure. Further, the separate preheater enclosure is eliminated and the vapor space of the low pressure steam generator is utilized for reception of the preheater coil 100.

It is manifest that all forms of the invention may be modified to receive the intermittent heating controller illustrated in FIG. 2, it being noted in each instance that the controller may either open and close a motor valve controlling the supply of fuel gas to the fire tube burner, or may operate separately in conjunction with the temperature controller 29 or 124 for controlling steam supply to the heating coils 25 or 104 so that separate control of the preheater coil in its degree of heating of the incoming well stream may be carried out as found necessary or desirable. In all respects, such form of the invention provides for operation of the low temperature separation unit at minimum temperatures to provide maximum dehydration of the well stream and maximum recovery of marketable liquid hydrocarbons, the preheater coil making provision for well streams which tend to form gas hydrates prior to entry into the choke or other pressure reducing element, while the low pressure separator may be included for further stabilization of the recovered distillate and greater recoveries of such distillate.

Further, each form of the invention provides for operation of the low temperature separation unit at a temperature which will produce a desired hydrocarbon composition for the dehydrated gas and will control hydrate formation prior to entry of the well stream into the choke or other pressure-reducing means.

Figure 5:
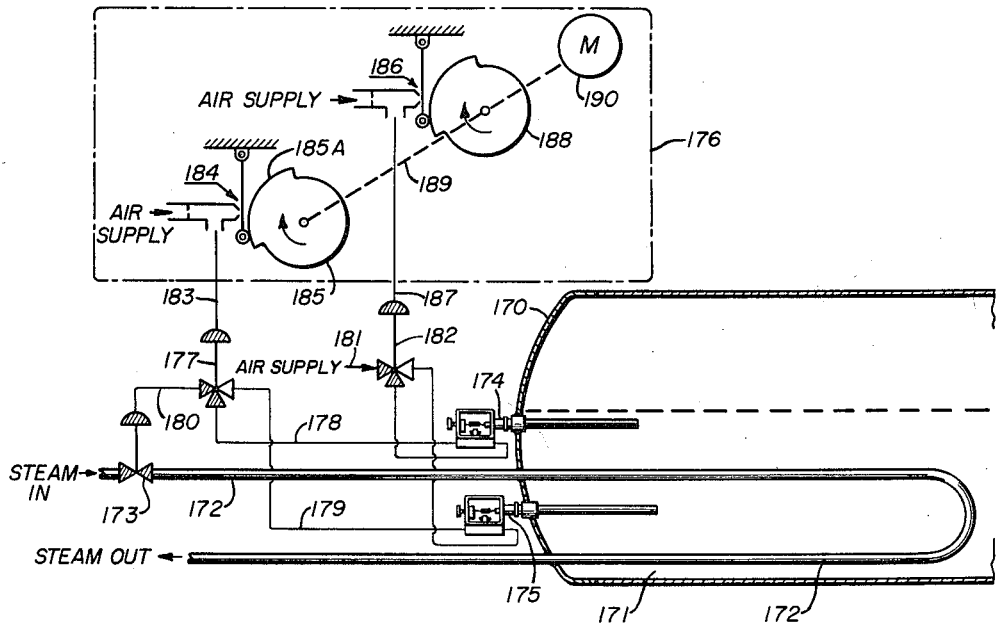
FIG. 5 is a schematic view showing control of the separator at the two temperatures.

Temperature controller 29 of FIG. 1 has been disclosed as sensing the heating of the lower portion of the vessel 22 through a temperature bulb 30 and controlling a motor valve 31 in the stream inlet conductor 26 for maintaining a desired degree or level of heating within vessel 22. In FIG. 3, valve 102 is operated by a temperature controller 124 which responds to a temperature probe 125 positioned in the water stratum in the lower portion of the vessel 93 and functioning to maintain said water stratum at a desired or predetermined temperature which will control hydrates in the vessel 93. FIGS. 4 and 5 show how this index of control can be used to give the results sought by the control of FIG. 2 with the additional advantage of a set point control for the measured temperature.

The FIGS. 4 and 5 systems give a more precise program of cyclic operation which will bring the separator to the minimum temperature for the longest period and provide even more recovery of liquefiable hydrocarbons than the control system of FIG. 3.

The structure of FIG. 3 does embody the important concept of cyclic heating of the separator liquids. The systems of FIGS. 4 and 5 fall under this concept. However, the FIGS. 4 and 5 systems extend this broad concept by providing for the actual temperature reached by the liquids feeding back into the system to control the cycling.

FIG. 4 discloses the simpler of the two systems. Temperature controllers are disclosed, directly responsive to the temperature of the liquids of the well stream collected in the bottom of the separator vessel. Each of the two temperature controllers develops an output signal at a predetermined value of the temperature to which it is exposed. The signals of the controllers are opposed; when one signal becomes the greater of the two, steam is controlled to flow into heat exchange with the well stream liquids. When the second signal becomes the greater of the two, the stream is isolated from heat exchange with the well stream liquids. The heat of the steam is constantly demanded by the well stream liquids flowing through the separator vessel; therefore, the collection of liquids has its temperature cycled between the two set point values of the two controllers.

More specifically, referring to FIG. 4, a sectioned portion of a separator vessel 150 is illustrated. This vessel 150 is similar to vessel 93 of FIG. 3 and vessel 21 of FIG. 1. A collection of well stream liquids 151 is carried in this low temperature separator. These liquids are heated by steam, just as shown in FIGS. 1 and 3. A steam inlet conduit 152 and a steam outlet conduit 153 are shown, leading into and out of vessel 150. The steam into these conduits is controlled by valve 154 which is shown as closed by a spring not shown and opened by a control fluid pressure placed on top of its diaphragm operator. Control of valve 154 means control of the temperature of liquids 151.

Valve 154 is, in turn, controlled by a system including temperature controllers 155 and 156. These controllers are shown mounted in specific locations on separator vessel 150. Obviously, their location in an actual reduction to practice may be governed by many factors which need not be presently considered. All the present disclosure advances is the broad concept of having controller 155 and 156 respond directly to the temperature of liquids 151 and cycle that temperature between their set point values.

Temperature controllers 155 and 156 are shown in the form of specific instruments manufactured by National Tank Company, Tulsa, Oklahoma. These controllers are presently cataloged under the designation CTS–1025 and termed a glass-metal thermo-regulator. Further, the structure of these controllers is the subject of a United States patent application S.N. 48,965, now Patent No. 3,112,881, issued December 3, 1963, filed August 11, 1960, by Robert A. Hodgson.

The primary elements of the controllers are their cases mounted through the wall of separator vessel 150. Sheath 157 of unit 155 is mounted as the higher of the two units to denote its control of the higher temperature limit of liquids 151. The elongation of sheath 157 causes glass rod 158 to take various positions. Flapper-spring 159 urges rod 158 against the end of sheath 157. Sheath 157 shortens as it cools, moving rod 158 to the left, against the force of spring-flapper 159.

To develop its force, spring-flapper 159 is bowed between the end of rod 158 and an adjustable rest 160. The mid-point of spring-flapper 159 positions relative a fluid pressure nozzle 161. This flapper-nozzle couple controls a supply pressure in a well-known manner to establish an output fluid pressure in pipe 162.

When the temperature of liquids 151 rises, sheath 157 elongates. Rod 158 moves away from adjustable stop 160. The spring-flapper becomes less bowed; straightens out. As shown in FIG. 4, the spring-flapper approaches nozzle 161 when it straightens out, builds up the nozzle pressure and thereby establishes the output signal as this fluid pressure in pipe 162.

Temperature controller 156 operates in a manner similar to the operation of unit 155. The basic difference is that the spring-flapper 159A of unit 156 is bowed in the direction opposite to the bow of spring-flapper 159. Therefore, depending on the setting of stop 160A and the position of nozzle 161A, an output fluid pressure will be established in pipe 163 when a predetermined temperature, lower than the upper limit, is reached.

Obviously, there will be a range of pressures established continuously in pipes 162 and 163. As each pressure reaches a maximum value, the second pressure will be at the minimum value in its range. Thus we have a pneumatic see-saw of fluid pressures. These pressures are opposed across a diaphragm 164 to position a stem 165 attached centrally to the diaphragm.

Stem 165 is shifted between its two positions when the differential between the pressures in pipes 162 and 163 reaches a value high enough to overcome a consistent resistance to its movement. This resistance could be provided by centering springs acting on stem 165 in opposition. In FIG. 4, the resistance is provided by the spring-urged mechanism of snap-acting valve 166.

Valve 166 is illustrated as a unit disclosed in at least United States Patent 2,860,660 issued to John C. Swatsworth, November 18, 1958. It has an actuating lever moved by abutments on shaft 165. This lever is spring biased and throws a valve element to two positions; one position vents pipe 167 and the alternate position connects a supply pressure to pipe 167. Therefore, the pressures in pipe 167 either open valve 154 against spring force or permit the spring force to close valve 154.

The operation of this basically simple system should be clear from the foregoing description. However, in review, the output signals of controllers 155 and 156 are manually determined in value to bring the liquids 151 up to temperature by opening steam valve 154 and then lower the temperature of the liquids 151 by shutting valve 154. In FIG. 4, the liquids have just been raised to temperature and the fluid pressure in pipe 162 has moved stem 165 down. Valve 166 is positioned to vent pipe 167. The spring of valve 154 holds valve 154 closed.

The liquids will cool as the low temperature continues to operate without steam in conduits 152 and 153. When the selected lower temperature is reached, valve 154 will be opened and the liquids heated by the steam.

FIG. 5 discloses one form of a control system which may cycle the temperature of the liquid bath of a low temperature separator and maintain the temperature reached at each end of the range for a period of time. The heating capacity of the steam conductor, the response of the liquids to heating, the cooling effect of the low temperature operation—these and other factors, such as ambient temperature variation, may make simple cycling of the bath temperature undesirable for most efficient operation.

It may be quite desirable that the temperature of the liquid bath be held at the low value for a fairly long period. Hydrates may be allowed to collect during this period, followed by a period of rapid heating with steam. In general it is contemplated that the heating be the shorter of the two periods, but here again, it may be desirable to carefully establish the period for holding the bath temperature at its high level. This concept of operation is embodied in the system of FIG. 5.

In FIG. 5 a portion of a low temperature separator vessel 170 is shown, similar to vessel 150 of FIG. 4. Liquids 171 are collected in the lower portion of vessel 171. Steam conduit 172 is shown in heat exchanging relationship with liquids 171. Valve 173 is mounted in conduit 172 to control the steam allowed to enter conduit 172 and raise the temperature of liquids 171.

Temperature controllers 174 and 175 are mounted through the wall of vessel 170. The output of these controllers modulate the position of steam valve 173 to bring the temperature of liquids 171 to each of their two set point values.

A time-cycle controller 176 periodically places each of the temperature controllers 174 and 175 in command of steam valve 173. Additionally, time-cycle controller 176 is shown as provided with a control of the supply of fluid pressure to the controllers. Each controller is supplied from a common source as that particular controller supplied is connected to valve 173. It is possible to continuously supply each controller 174 and 175 with a source of fluid pressure. The outputs could still be selectively applied to steam valve 173.

A simple three-way valve 177 is shown receiving the output of high temperature controller 174 in pipe 178. The output of low temperature controller 175 is also received by valve 177 with pipe 179. Two-position three-way valve 177 simply connects pipe 178 or 179 to pipe 180. Pipe 180 places these fluid pressures on the diaphragm operator of valve 173. The control problem then becomes one of simply positioning valve 177 to each of its two positions. Time-cycle controller 176 performs this function.

The fluid pressure supply for temperature controllers 174 and 175 is provided with pipe 181. Two-position three-way valve 182 diverts this fluid pressure to either controller 174 or 175. If the controller placed in command of steam valve 173 is simultaneously supplied fluid pressure from pipe 181, the temperature of liquids 171 is thereafter automatically raised or lowered to the set point of the controller and maintained at that temperature for a predetermined period of time. Time-cycle controller 176 performs this function.

Controller 176 is shown with two outputs. One output is the fluid pressure in pipe 183. This fluid pressure in pipe 183 is placed on the diaphragm controller of valve 177. A spring urges the valve 177 toward one of its two positions. The high value of the fluid pressure in pipe 183 overcomes the spring force to position the valve 177 in the second of its two positions.

The control fluid pressure of pipe 183 is developed by the nozzle-flapper couple 184. Cam 185 gives the flapper two positions for predetermined periods of time. Therefore, the high value of fluid pressure is developed by positioning the flapper as shown by lobe 185A for the length of time it takes cam 185 to rotate lobe 185A under the follower of the flapper. FIG. 5 shows the lobe 185A positioning the flapper to cover the nozzle and thereby develop the high value of fluid pressure output in pipe 183. Valve 177 is indicated as positioned to connect the output pipe 178, of high temperature controller 174, to valve 173. For the relatively short period of this connection, controller 174 will open valve 173 and modulate valve 173 to maintain a predetermined set point value of temperature. Hydrates previously collected in vessel 170 will be melted at the high temperature. The separator vessel will then be prepared to go back to the low temperature operation for a relatively long period of time.

When lobe 185A completes rotation under the follower of the flapper, the nozzle is left unrestricted and the pressure in pipe 183 falls to a predetermined value. The spring of valve 177 takes over control of the valve and moves it to the second position. Pipe 178 is disconnected from pipe 180 and pipe 179 connected to pipe 180. Controller 175 takes over control of valve 173 and lowers the temperature of liquids 171 to its set point. Controller 175 remains connected to steam valve 173 until lobe 185A again rotates under the flapper of couple 184.

Nozzle-flapper 186 establishes the second output of controller 176. This second output in pipe 187 is placed on the diaphragm operator of valve 182. Cam 188 controls couple 186, as cam 185 controlled couple 184, to position valve 182 so that controller connected to steam valve 173 will have supply pipe 181 connected to it at the same time.

Both cam 185 and cam 188 are mounted on a common shaft 189. Shaft 189 is connected to constant speed motor 190. The lobes of cams 185 and 188 then determine the program of a complete cycle for liquids 171. The liquids 171 are brought to a predetermined high temperature to melt hydrates, then the separator is operated at a predetermined low temperature at which a maximum of hydrocarbons is liquefied.

It is further noted that any or all of the vessels or enclosures forming components of this system may be of either the horizontal or vertical type. It is also to be noted that in each modification of the invention, the heating coils in the low temperature separator are at an elevation above the steam generator, or at least above the water level in the generator. Hence, the coils are always maintained free of water, and in the event of burner failure or prolonged shutting down of the burner due, for instance, to a low water level, possible freezing and rupturing of the heating coils within the relatively high pressure enclosure of the low temperature separator is avoided. Although of less consequence, the preheater is also above the steam generator in some of the forms of the invention.

The foregoing description of the invention is explanatory thereof and various changes in the size, shape and materials, as well as in the details of the illustrated construction may be made, within the scope of the appended claims, without departing from the spirit of the invention.

This application is a continuation in part of our application Serial Number 751,069 filed July 25, 1958, now Patent No. 3,012,629, issued December 12, 1961.

We claim:
1. The method of low temperature separation of high pressure predominantly gaseous well streams including,
   chilling the well stream by passing the stream through a pressure reduction step and into a low temperature separation zone wherein the well stream separates and stratifies into a gaseous stratum and cold water and hydrocarbon strata,
   withdrawing gas from the separation zone,
   withdrawing water and hydrocarbons from the separation zone,
   raising the temperature of at least the water stratum to a first predetermined level and maintaining the temperature at the first level for a predetermined period of time until hydrates formed by chilling the well stream have been melted,
   and lowering the temperature of at least the water stratum to a second predetermined level alternately with the heating periods and maintaining the temperature at the second level for a predetermined period of time until maximum liquefaction of hydrocarbons from the well stream is brought about by the chilling.
2. A low temperature separation system for high pressure predominantly gaseous well streams including,
   a low temperature separator,
   a well stream inlet conductor to the separator,
   means in the inlet conductor for causing the well stream to undergo a pressure reduction to chill the well stream,
   a gas outlet from the separator,
   means for withdrawing water and hydrocarbons from the separator,
   a source of heat connected to the separator for heating the lower portion of the separator,
   means for supplying heat from the source to the lower portion of the separator to raise the temperature of the liquids in the bottom of the separator to a first predetermined level for a first predetermined period of time which will melt hydrates formed by chilling the well stream,
   and means for terminating the supply of heat from the source to cause the temperature of the liquids in the bottom of the separator to lower to a second predetermined level for a second predetermined period of time which will provide maximum liquefaction of hydrocarbons from the well stream.

References Cited by the Examiner
UNITED STATES PATENTS

| | | | |
|---|---|---|---|
| 2,747,002 | 5/56 | Walker et al. | 55—57 |
| 2,928,885 | 3/60 | Newsome | 55—57 |
| 3,003,007 | 10/61 | Newsome | 55—57 |
| 3,012,629 | 12/61 | Walker et al. | 55—57 |

HARRY B. THORNTON, *Primary Examiner.*

HERBERT L. MARTIN, ALPHONSO SULLIVAN,
*Examiners.*